US012434372B2

(12) United States Patent
Andric

(10) Patent No.: US 12,434,372 B2
(45) Date of Patent: Oct. 7, 2025

(54) MOTORCYCLE ROTATIONAL LIFT

(71) Applicant: Cory C. Andric, Beloit, OH (US)

(72) Inventor: Cory C. Andric, Beloit, OH (US)

(*) Notice: Subject to any disclaimer, the term of this patent is extended or adjusted under 35 U.S.C. 154(b) by 354 days.

(21) Appl. No.: 18/150,436

(22) Filed: Jan. 5, 2023

(65) Prior Publication Data
US 2024/0227152 A1    Jul. 11, 2024

(51) Int. Cl.
*B25H 1/00* (2006.01)
*B66F 5/00* (2006.01)
*B66F 7/00* (2006.01)

(52) U.S. Cl.
CPC ............ *B25H 1/0014* (2013.01); *B66F 5/00* (2013.01); *B66F 7/00* (2013.01); *B66F 2700/123* (2013.01)

(58) Field of Classification Search
CPC . B25H 1/0014; B66F 5/00; B66F 5/04; B66F 7/00; B66F 2700/123; B66F 3/005
See application file for complete search history.

(56) References Cited

U.S. PATENT DOCUMENTS

| 3,836,014 | A | * | 9/1974 | Johansson | B66F 7/0633 414/652 |
| 4,324,384 | A | * | 4/1982 | Elser | B25H 1/0014 254/94 |
| 4,460,158 | A | * | 7/1984 | Chiesa | B25H 1/0014 254/124 |
| 5,211,376 | A | * | 5/1993 | Anderson | B25H 1/0014 254/134 |
| 5,769,397 | A | * | 6/1998 | Dhein | B66F 5/04 254/134 |
| 6,488,157 | B2 | | 12/2002 | Chen | |
| 6,836,942 | B2 | | 1/2005 | Oleski | |
| 7,100,928 | B1 | | 9/2006 | Van Valkenburgh | |
| 7,134,643 | B1 | * | 11/2006 | Williams | B66F 5/04 254/10 R |
| 7,648,317 | B2 | | 1/2010 | Kobacker, II et al. | |
| 2003/0089896 | A1 | * | 5/2003 | Reinikka | B66F 7/08 254/134 |
| 2004/0051089 | A1 | * | 3/2004 | Lance | B66F 3/005 254/131 |
| 2007/0096070 | A1 | * | 5/2007 | Kobacker, II | B25H 1/0014 254/131 |
| 2008/0100030 | A1 | | 5/2008 | Brakhage et al. | |
| 2009/0189135 | A1 | * | 7/2009 | Van Der Westhuizen | B25H 1/0014 254/93 H |
| 2010/0013186 | A1 | | 1/2010 | Markie | |
| 2012/0097810 | A1 | * | 4/2012 | Burnett | B66F 5/00 248/176.1 |

* cited by examiner

Primary Examiner — Seahee Hong
(74) Attorney, Agent, or Firm — Harpman & Harpman

(57) ABSTRACT

A lifting and tilting device for motorcycles that engages the rear axle portion of a motorcycle and rotatably lifts the bike on its axle pivot point to a near vertical upstanding position for ease of access and cleaning. The device has a pair of axle portion engagement supports with a hydraulic jack and engagement arm engageable on the frame of the bike. A wide support base has pairs of frame stabilization extensions to support the bike in its upright rotated position.

4 Claims, 5 Drawing Sheets

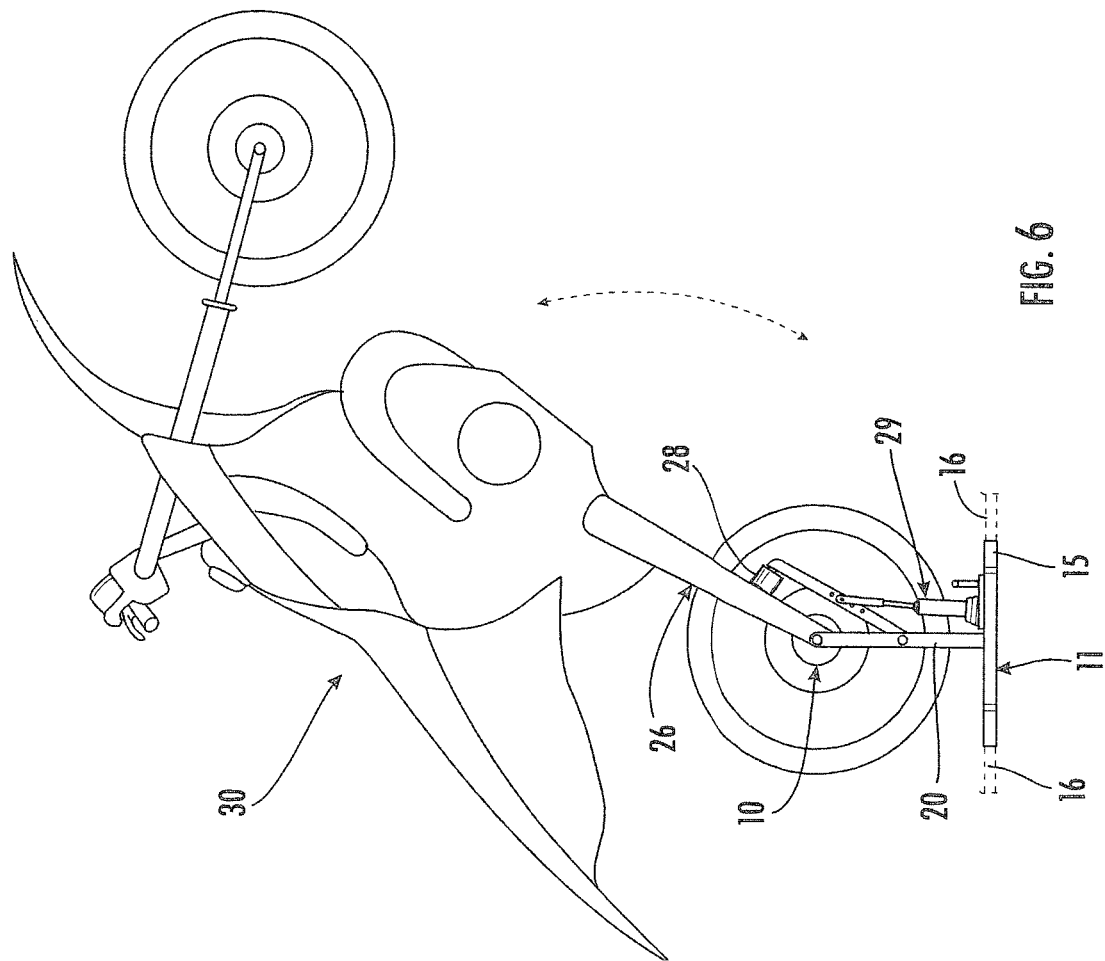

MOTORCYCLE ROTATIONAL LIFT

BACKGROUND OF THE INVENTION

1. Technical Field

This device relates to motorcycles and bike lifts used to lift motorcycles off the ground primarily for maintenance and service.

2. Description of Prior Art

Prior art lifts and stands have been developed to engage the motorcycle and support it in a static or elevated access position, see for example U.S. Pat. Nos. 6,488,157, 6,836,942, 7,100,928, 7,648,317 and U.S. Publication 2008/0100030 and 2010/0013186.

In U.S. Pat. No. 6,488,157 is directed to a stand for supporting motorcycles having a rear frame axle engagement armature with a wheel based telescopically extendable user engagement handle to lift the rear wheel off the ground using a lever action.

U.S. Pat. No. 6,836,942 discloses a "third hand" tire jack for motorcycles. A U-shaped support stand with a wheel engagement portion so moving the extended lever, the tire is lifted and moved laterally for alignment with the swing arm, allowing attachment to the motorcycle.

U.S. Pat. No. 7,100,928 claims a motorcycle rear stand having a pair of vertical rear axle engagement supports adjustable to variable motorcycle heights.

U.S. Pat. No. 7,648,317 shows a rear motorcycle axle support stand that engages the rear axle and wheel of the motorcycle in a supported elevated secure position preventing excess lateral movement to the rear wheel.

A motorcycle center stand can be seen in U.S. Publication 2008/010030 having a bracket assembly that rotates under the motorcycle and applies a force upwardly on the rear end holding it in elevated vertical position.

Publication 2010/0013186 illustrates a power retractable motorcycle stand attached to the under carriage of the motorcycle allowing for deployment of the ground engagement support and lift bars selectively lifting the front end of the motorcycle.

SUMMARY OF THE INVENTION

A motorcycle rotatable pivot lift, holding the motorcycle by its rear axle portion to elevate to a near vertical upright access position with its front wheel off the ground. A lift support frame with dual axle pivot engagement and a pivoted extending lift arm engaging the frame in spaced relation to the rear axle. A hydraulic jack is pivotally linked to the lift arm and imparts lifting force effectively rotating the motorcycle on its rear axle. Ground engagement stabilization arms selectively extend from the lift's main support frame assuring proper stability and safety during the lifting operation.

DESCRIPTION OF THE DRAWINGS

FIG. 6 is a side elevational view of an actuated lift with the motorcycle in near vertical elevated lift position.

DETAILED DESCRIPTION OF THE INVENTION

Figure 1:
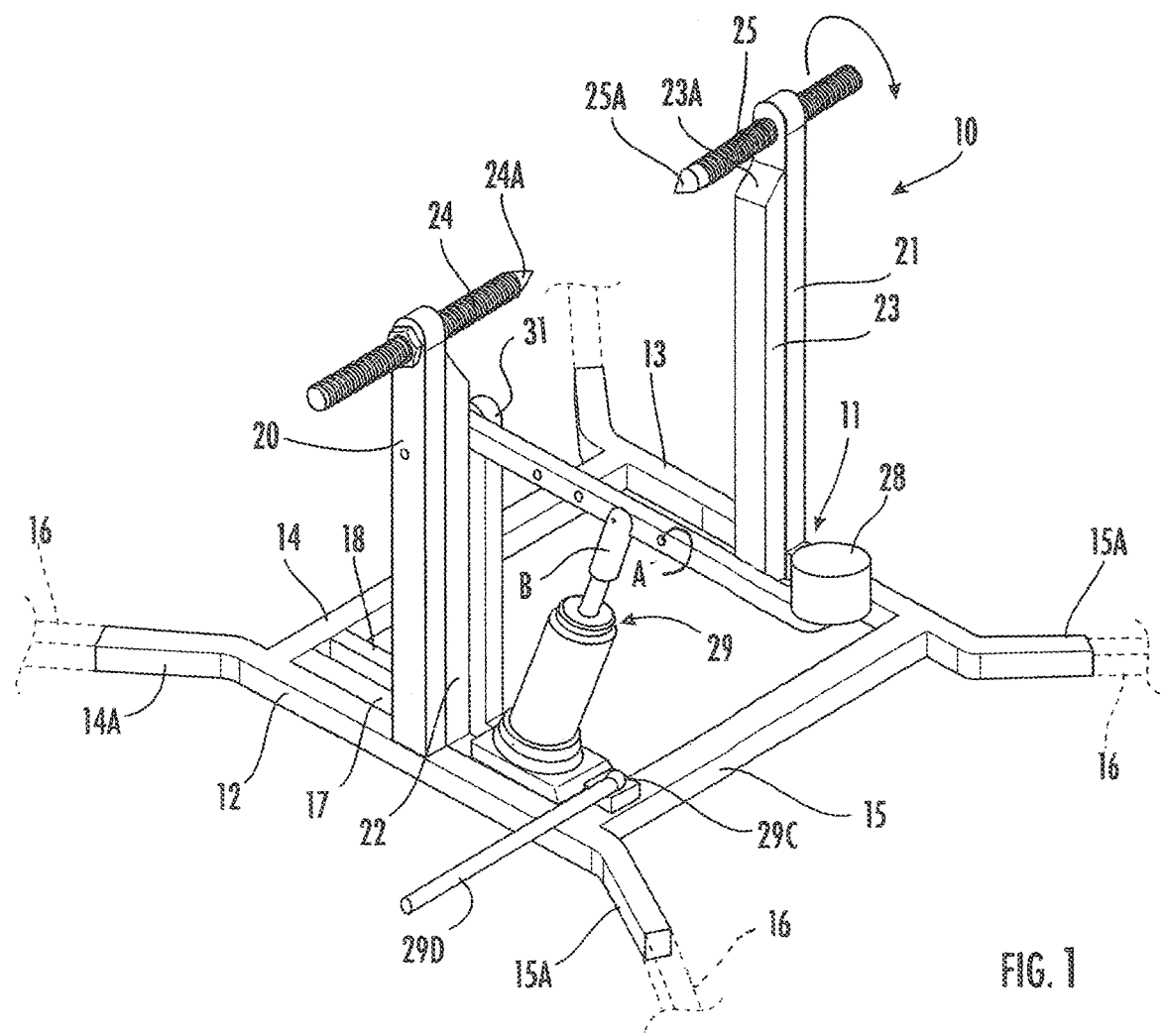
FIG. 1 is a perspective view of the motorcycle rotatable lift device of the invention.
Figure 2:
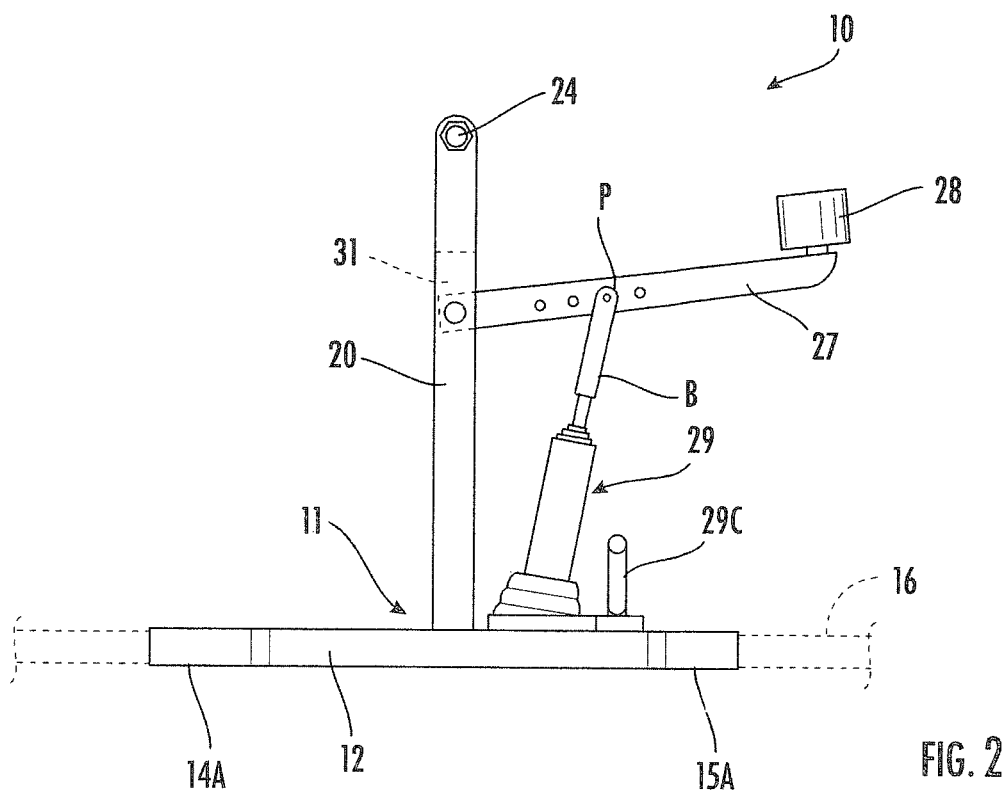
FIG. 2 is a side elevational view of the lift.
Figure 3:
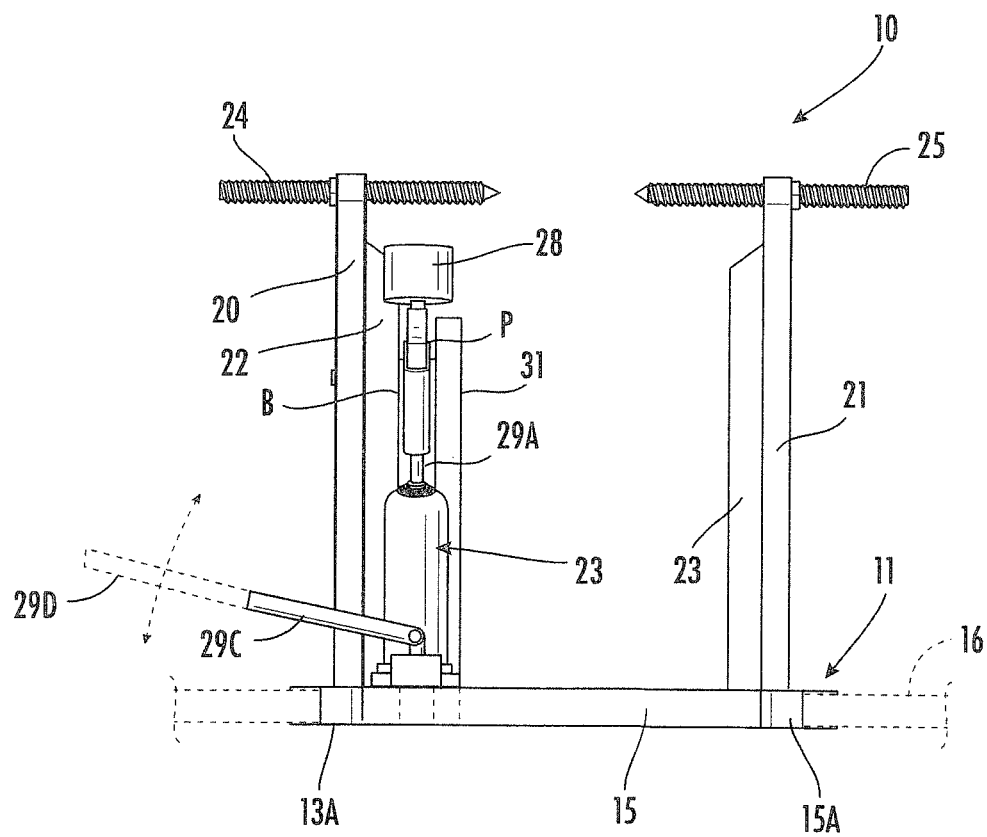
FIG. 3 is an end elevational view on lines 3-3 of FIG. 2.
Figure 4:
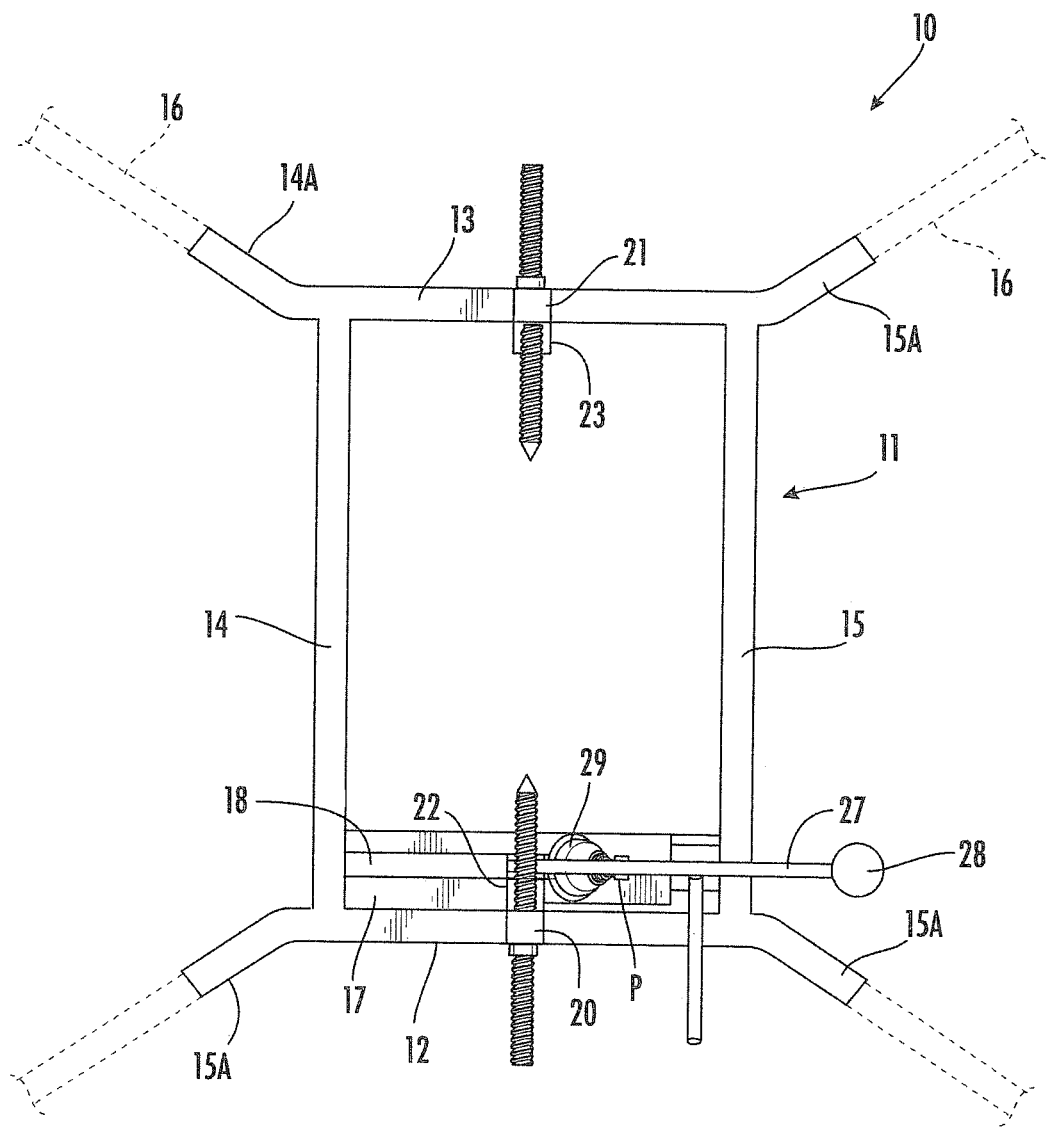
FIG. 4 is a top plan view of the lift.

Referring to FIGS. 1-4 of the drawings, the motorcycle lift 10 of the invention can be seen having a main ground engagement base frame 11 formed by spaced parallel tubular side members 12 and 13 and respective interconnecting spaced parallel end members 14 and 15 attached at right angles thereto. Each of the end members 14 and 15 have angular offset end portions 14A and 15A from which tubular stabilization extension inserts 16 are selectively inserted, shown in broken lines, to form a wide stable ground engagement support base. A pair of tubular base frame members 17 and 18 are secured between and to one of the side members 12 and 13 with base support member 17 longitudinally abutting the end tubular member 15 and the base member 18 in spaced parallel relation thereto as best seen in FIG. 4 of the drawings.

The motorcycle lift 10 has a pair of upstanding bike engagement support arms 20 and 21 respectively attached at right angles to the end members 14 and 15 as by welding midway along their longitudinal length. Each of the support arms 20 and 21 has a reinforcing member 22 and 23 respectively secured longitudinally thereto with respective foreshortened tapered free ends 22A and 23A, best seen in FIGS. 2 and 3 of the drawings.

A pair of oppositely disposed bike engagement pins 24 and 25 are attached to the respective free ends of the upstanding support arms 20 and 21 being threadably secured at right angles there through. It will be apparent from the foregoing description that the respective bike frame engagement pins 24 and 25 each with a bike engagement pointed end 24A and 25A can be threadably advanced towards one another by directional broken arrows so as to engage the respective rear drive axle support frame 26 of a motorcycle 30 illustrated best in FIGS. 5 and 6 of the drawings.

A lifting arm 27 is pivotally supported between the upstanding reinforcing members 22 on the support arm 20 and a secondary upstanding support arm 31 extending at right angles from the base frame member 18 as best seen in FIG. 3 of the drawings. The lifting arm 27 has a cylindrical engagement pad 28 extending from its free end to provide a point of bike frame engagement during use.

A hydraulic jack assembly 29 is provided which is secured to a base plate 30 overlying and secured to the respective frame members 17 and 18. A bifurcated mounting bracket B extends from the piston rod 29A of the jack assembly 29 and is pivotally secured to pivot engagement adjustment apertures A extending in spaced longitudinal relation to one another in the lifting arm by a registration pin P. This orientation allows the effective adjustment of the engagement of the hydraulic jack assembly to the lifting arm depending on bike requirements during use. The jack assembly 29 has a jack handle fitting 29C for use with a handle 29D shown in broken and solid lines for jack activation as will be understood by those skilled in the art.

Figure 5:
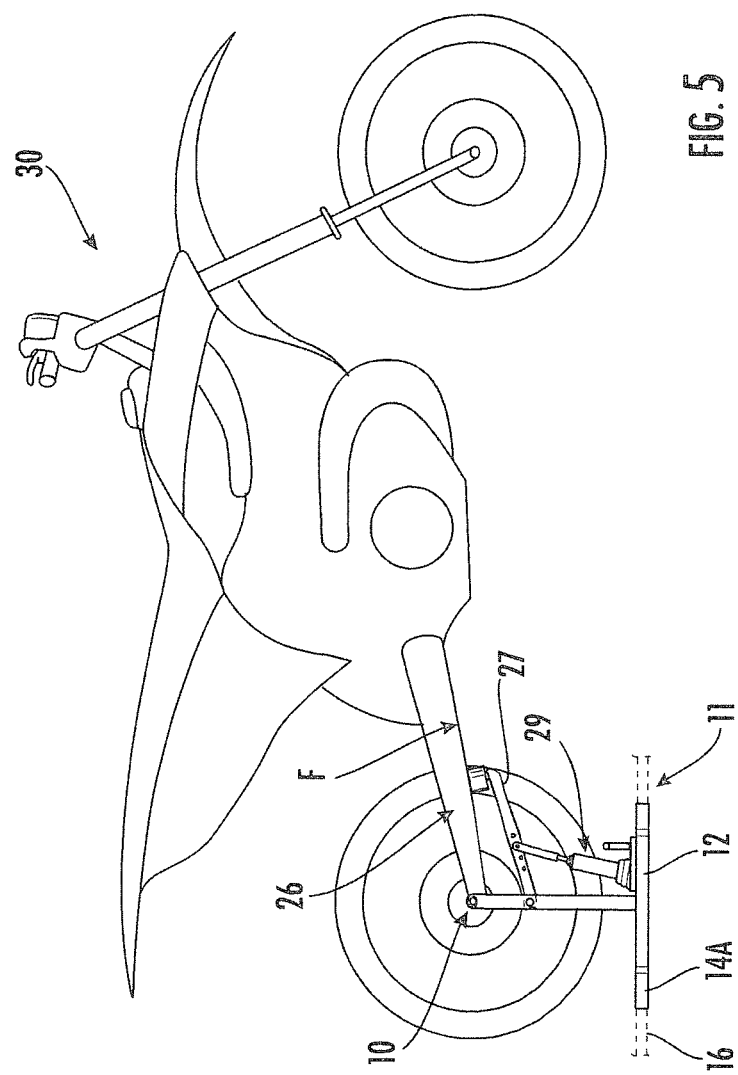
FIG. 5 is a side elevational view of the lift with a motorcycle secured for rotational lifting.

Referring now to FIGS. 5 and 6 of the drawings, in operation, a motorcycle 30 is positioned with its rear drive wheel 33 and axle support frame within the lift 10. The respective bike engagement pins 24 and 25 are threadably advanced to engage and hold the respective sides of the drive wheel support axle frame. The hydraulic jack 29 is activated by the user, not shown, pivoting the lift arm 27 with the end engagement pad 28 engaging the bottom of the bike frame at F. As the jack 29 advances, the lift arm 27 pivots and lifts and rotates the motorcycle 30 on the pins 24 and 25 points of engagement elevating the motorcycle 30 to a near vertical upright position as seen in FIG. 6 of the drawings.

It will be evident that this orientation allows for a more complete and effective access and cleaning of the bike which is heretofore not possible. The wide stance of the ground engagement base frame 11 with respective end extensions 16 allows for a safe, secure upright positioning of the motorcycle 30.

Upon completion of service and cleaning the jack 29 is released as will be understood by those skilled in the art, allowing for controlled descent of the motorcycle 27 to a horizontal and removable position from the motorcycle lift 10 of the invention.

It will thus be seen that a new and novel motorcycle lift configuration has been illustrated and described that provides a unique rotational lifting action to the motorcycle in a safe and secure manner. It will be evident therefore to those skilled in the art that various changes and modifications may be made therein without departing from the spirit of the invention.

Therefore, I claim:

1. A motorcycle lift comprising a base frame, a pair of fixed upstanding bike engagement support arms extending in spaced parallel relation from said base frame, first and second bike frame engagement pins extending in spaced longitudinal relation outwardly from said respective fixed upstanding bike engagement support arms,
a leverage lifting arm pivotally secured to and extending from a reinforcing member of one of said upstanding bike engagement support arms and the free ends of a secondary fixed upstanding parallel support arm extending from said base frame in parallel relation to said one of said upstanding bike engagement support arms,
a frame registration pad on the end of said leverage arm,
a lifting jack in communication with said base frame and said leverage arm,
said leverage arm movable from a first position to a second load position on said base frame.

2. The motorcycle lift set forth in claim 1 wherein said first and second bike frame engagement pins are in independent threadable registration through said respective fixed upstanding bike engagement support arms and are in axially aligned relation to one another.

3. The motorcycle lift set forth in claim 1 wherein said lifting jack has a bifurcated apertured bracket extending therefrom selectively registerable with a longitudinal spaced apertures in the leverage arm.

4. The motorcycle lift set forth in claim 3 wherein said bifurcated apertured bracket further comprises a pin which engages said leverage arm and said aperture therein.

* * * * *